(12) United States Patent
Wang et al.

(10) Patent No.: US 10,794,740 B2
(45) Date of Patent: Oct. 6, 2020

(54) MAGNETIC SENSOR ASSEMBLY FOR ROTARY GAS METERS

(71) Applicant: ROMET LIMITED, Mississauga (CA)

(72) Inventors: Xinmin Wang, Mississauga (CA); Lin Lezhong, Mississauga (CA); Andrew Smich, Mississauga (CA)

(73) Assignee: ROMET LIMITED, Mississauga (CA)

( * ) Notice: Subject to any disclaimer, the term of this patent is extended or adjusted under 35 U.S.C. 154(b) by 0 days.

(21) Appl. No.: 16/716,868

(22) Filed: Dec. 17, 2019

(65) Prior Publication Data

US 2020/0217696 A1    Jul. 9, 2020

Related U.S. Application Data

(60) Provisional application No. 62/789,610, filed on Jan. 8, 2019.

(51) Int. Cl.
| | | |
|---|---|---|
| G01F 1/11 | (2006.01) | |
| G01F 1/68 | (2006.01) | |
| G01F 1/115 | (2006.01) | |

(52) U.S. Cl.
CPC .................................. *G01F 1/115* (2013.01)

(58) Field of Classification Search
CPC ....................................... G01F 1/11; G01F 1/68
See application file for complete search history.

(56) References Cited

U.S. PATENT DOCUMENTS

| | | | | |
|---|---|---|---|---|
| 9,593,971 B2 * | 3/2017 | Wang | .................... | G01F 15/075 |
| 10,140,480 B2 * | 11/2018 | Wang | .................... | B25F 5/005 |
| 2006/0081068 A1 * | 4/2006 | Sallee | .................. | G01F 15/063 |
| | | | | 73/861.88 |

FOREIGN PATENT DOCUMENTS

| | | |
|---|---|---|
| CA | 2858734 A1 | 2/2016 |
| CA | 3004875 A1 | 2/2016 |

OTHER PUBLICATIONS

International Search Report dated Mar. 24, 2020; 4 Pages, for Corresponding International PCT Patent Application No. PCT/CA2019/051828.
Written Opinion dated Mar. 24, 2020; 7 Pages, for Corresponding International PCT Patent Application No. PCT/CA2019/051828.

* cited by examiner

*Primary Examiner* — Jewel V Dowtin

(57) ABSTRACT

A magnetic sensor assembly for rotary gas meters includes a counter module electronic volume corrector ("EVC"). In one aspect, the assembly includes a magnetic sensor probe configured to be releasably secured within an aperture of a first gas meter body. The sensor probe may alternatively be positioned within an adapter sleeve. The adapter sleeve is configured to be releasably secured within an aperture of a second gas meter body. In another aspect, the counter module EVC includes a base coupling member, and the assembly includes first and second magnetic sensor probes, the probe being configured to be releasably secured within apertures of first and second gas meter bodies, respectively. Each probe has a probe coupling member that is releasably engagable with the base coupling member.

20 Claims, 13 Drawing Sheets

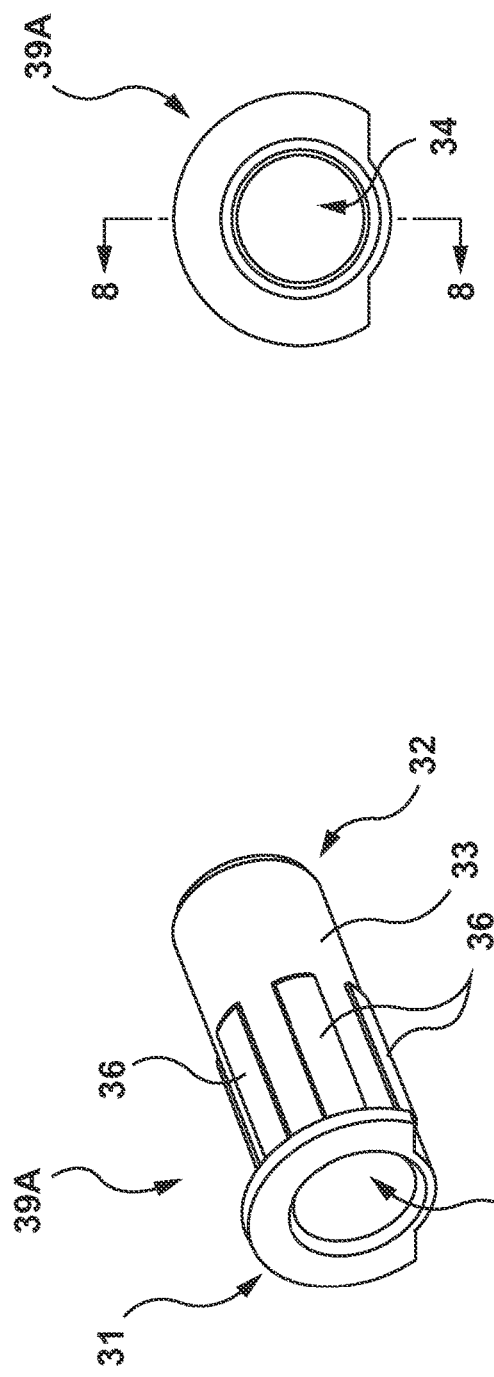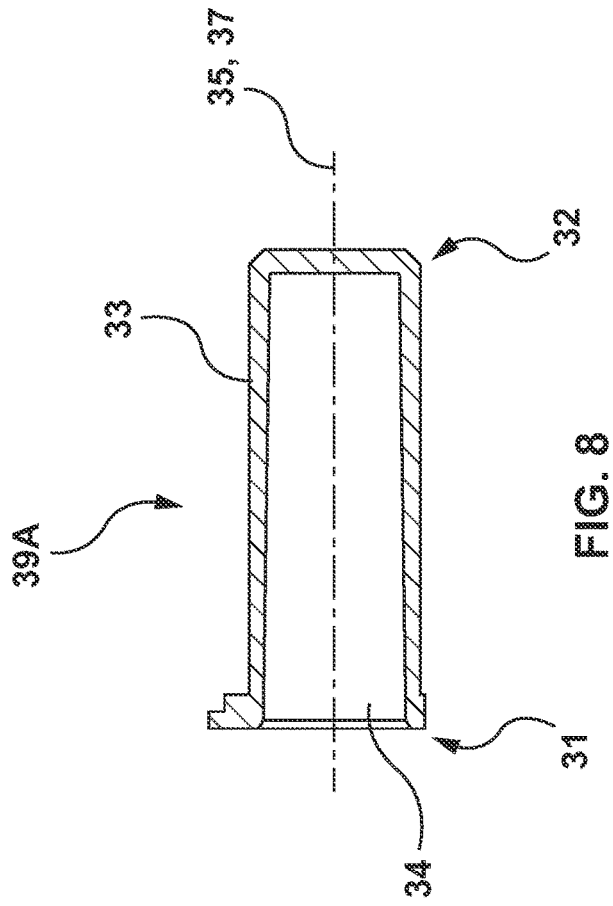

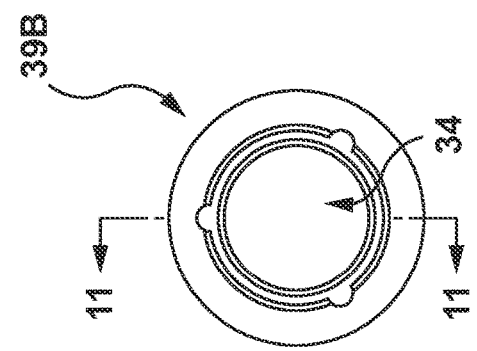
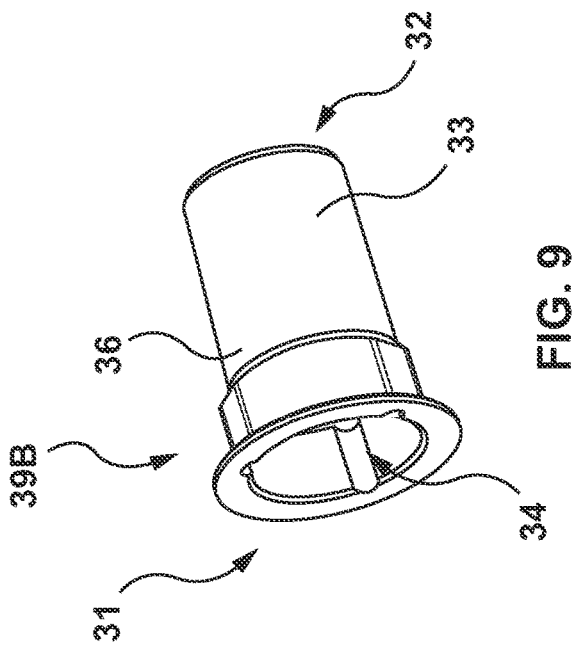
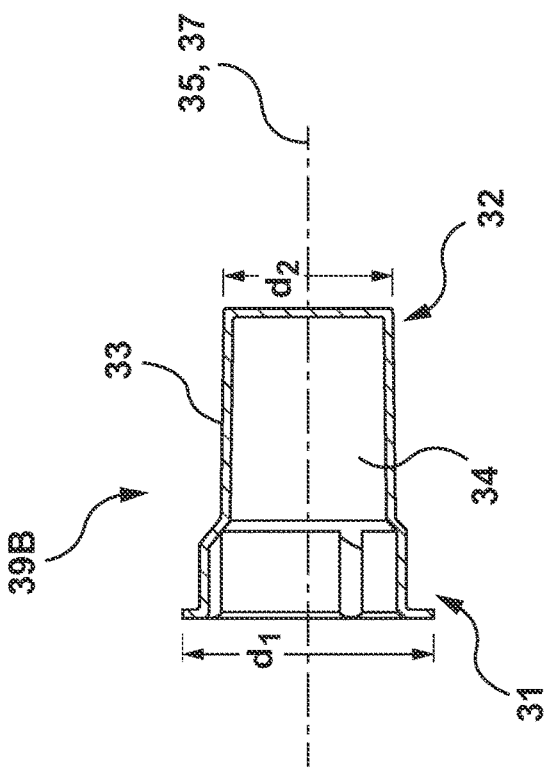

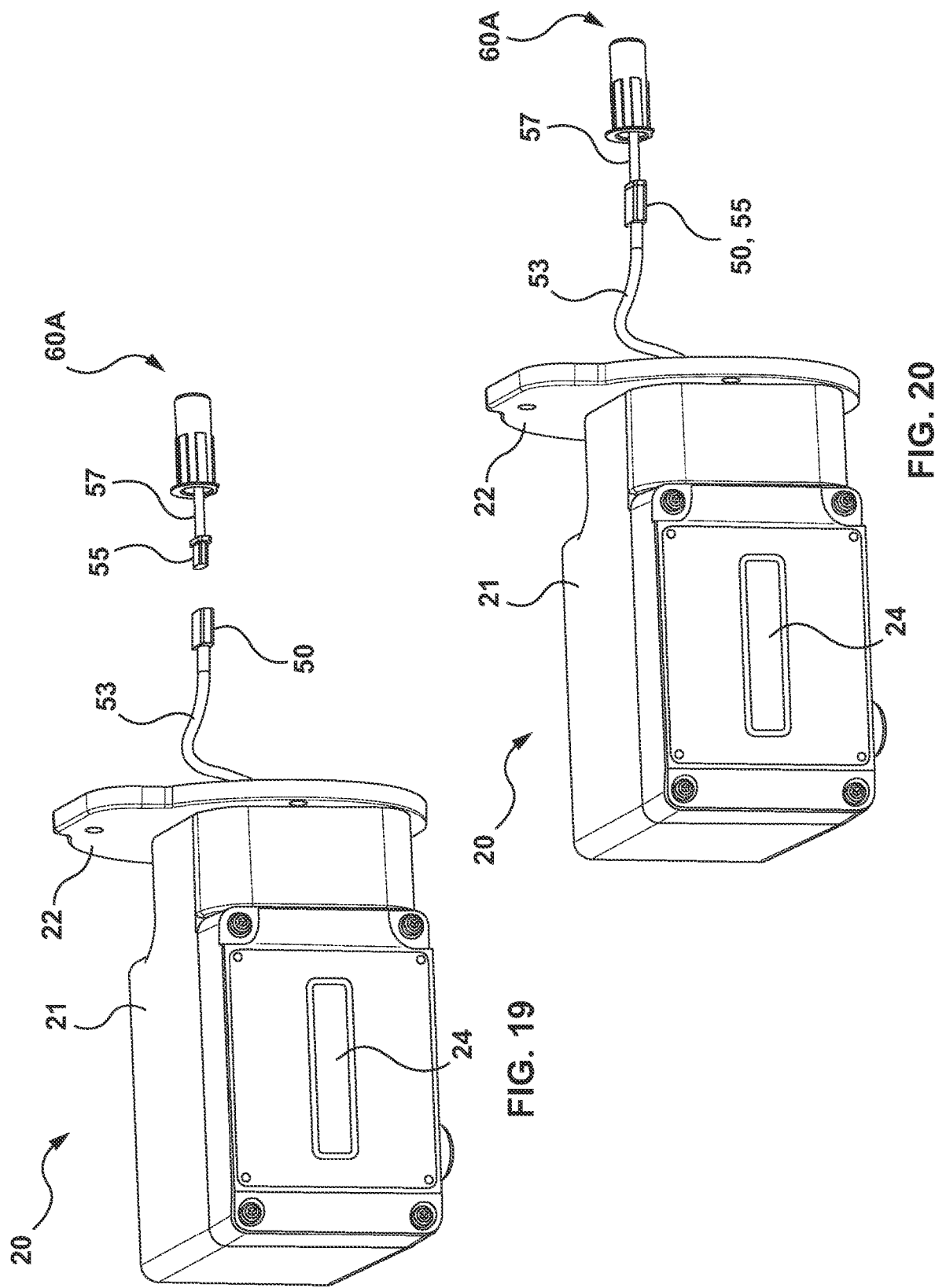

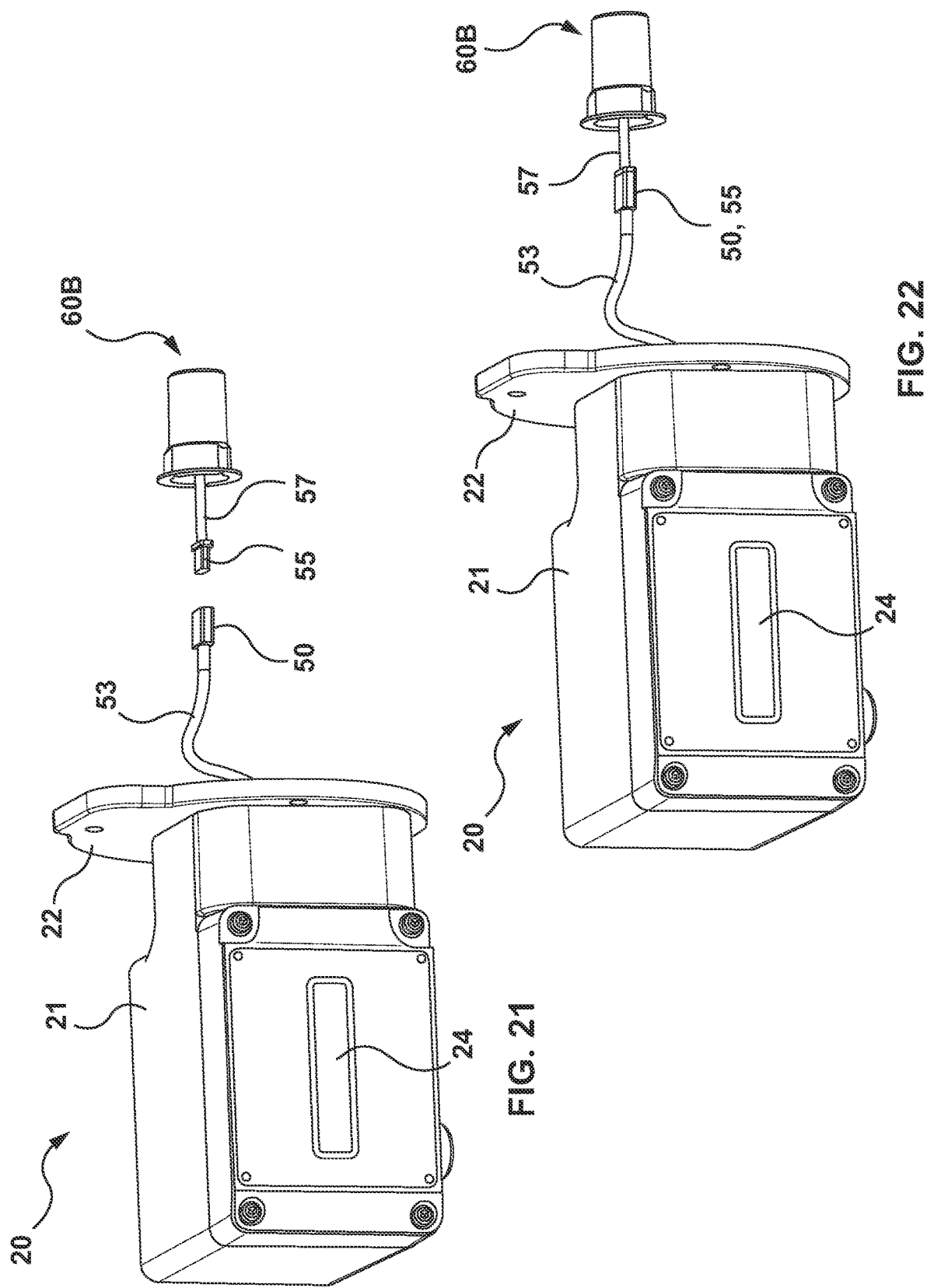

MAGNETIC SENSOR ASSEMBLY FOR ROTARY GAS METERS

CROSS-REFERENCE

This application claims the domestic benefit of U.S. Provisional Application No. 62/789,610 filed, Jan. 8, 2019, the content of which is incorporated herein in its entirety.

FIELD

This disclosure relates generally to gas meter equipment, and more specifically to a magnetic sensor assembly for use with rotary gas meters.

INTRODUCTION

Gas meters may be used to measure volumes of gas transported and/or used for heating or cooling purposes. For large-scale and/or industrial uses, most gases are typically sold on a price-per-volume basis. Accordingly, it is generally considered desirable to measure gases being transported and/or used with a relatively high degree of accuracy. For example, natural gas may be characterized as a relatively expensive commodity, and it is important to accurately measure the amount of gas being transported and/or consumed, particularly at high volume rates. Accurate measurement may prevent a consumer from being overcharged by a provider, and it may also ensure that the consumer is charged for the entire volume of gas provided.

A common method of providing accurate measurement of a consumed gas is the use of one or more positive displacement rotary gas meters. When gas flows through such a rotary gas meter, fixed volumes of gas are displaced by, for example, two figure-eight impellers that rotate in opposite directions within a cylinder of known volume. The impellers of the gas meter rotate because of a lower differential pressure at the outlet of the meter than is present at the inlet. As they rotate, a fixed volume of gas or other fluid is entrapped and then moved toward the outlet. Therefore, with each full rotation of the impellers, a known volume of gas or other fluid is displaced through the outlet.

By measuring the number of rotations of the impellers, the volume of gas or other fluid displaced over a period of time can be determined. Also, as the lobed figure-eight impellers remain in a fixed relative position, it is only necessary to measure the rotational movement of one of the impellers. To accomplish this, in the case of positive displacement rotary gas meters that are electronically compensated, the impeller may be magnetically coupled to an electronic recording device.

Typically, a magnetic coupling device senses movement of the impellers by sensing the passage of magnets fixed to the rotating impellers. This may be done with a Wiegand sensor mounted outside the pressure body of the gas meter. The sensor then transfers a signal to the electronic recording device. This electronic device compensates for density changes due to fluctuations in the temperature, pressure, and/or composition of the gas being metered, resulting in an extremely accurate measurement of the consumed gas.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

A manufacturer of gas meter bodies may provide a mounting surface for a counter module with electronic volume corrector ("EVC") (or counter module EVC) that is common to a number of models and/or sizes of gas meter bodies to which a counter module EVC may be coupled. Typically, an aperture is provided proximate the counter module EVC mounting surface for providing access to a counter drive shaft of the gas meter. A magnetic sensor of the counter module EVC may be positioned within such an aperture for sensing the rotation of the counter drive shaft.

However, based on the relative location of the impeller within the gas meter body, the location of the impeller (and/or a counter drive shaft operatively coupled to the impeller) relative to the mounting surface may be different for different models and/or sizes of gas meter bodies.

Also, the size and/or internal profile of such a sensor aperture may be different for different models and/or sizes of gas meter bodies. For example, a model line of gas meter bodies produced by a first manufacturer may have a common sensor aperture size that is different from the sensor aperture size of other models of gas meter bodies produced by the first manufacturer, and/or that is different from the sensor aperture size provided in gas meter bodies produced by other manufacturers.

While a typical counter module EVC may be used with gas meter bodies having different relative locations of their common mounting surface and counter drive shafts (as the magnetic sensor, typically being permanently connected to the counter module EVC by flexible wiring, may be easily repositioned relative to the mounting surface), the differing sizes and/or internal profiles of sensor apertures that provide access to the counter drive shafts may require the use of a different counter module EVC (with an appropriately dimensioned magnetic sensor probe) with different models and/or sizes of gas meter bodies.

The apparatus disclosed herein may alternatively be used with gas meter bodies having different sizes and/or internal profiles of magnetic sensor apertures. The ability to use this 'universal' apparatus with multiple gas meter bodies may provide a number of advantages. For example, the number of different counter module EVCs that are required to be brought to a customer's facility when installing and/or repairing counter module EVCs may be reduced, as the same parts may be used with a wide variety of gas meters.

In accordance with a first broad aspect, there is provided a magnetic sensor assembly for rotary gas meters, the assembly comprising: a counter module EVC; a magnetic sensor probe operatively coupled to the counter module EVC and configured to be releasably secured within an aperture of a first gas meter body, the sensor probe having a first end, a second end, a generally cylindrical outer surface extending between the first and second ends, an outer diameter at the second end, and a longitudinal axis; and an adapter sleeve, the adapter sleeve having a first end, a second end, an outer surface extending between the first and second ends of the adapter sleeve, an outer diameter at the second end of the adapter sleeve, a longitudinal axis, and a sensor probe aperture extending from the first end of the adapter sleeve towards the second end of the adapter sleeve, the sensor probe aperture being configured to receive the sensor probe within the adapter sleeve, the adapter sleeve being configured to be releasably secured within an aperture of a second gas meter body, the aperture of the second gas meter body having a diameter that is greater than a diameter of the aperture of the first gas meter body, wherein, in a first configuration, the counter module EVC may be coupled to the first gas meter body with the sensor probe positioned within the aperture of the first gas meter body for sensing rotation of a counter drive shaft of the first gas meter body, and wherein, in a second configuration, the counter module EVC may be coupled to the second gas meter body with the sensor probe positioned within the adapter sleeve, and the adapter sleeve positioned within the aperture of the second gas meter body for sensing rotation of a counter drive shaft of the second gas meter body.

In some embodiments, the sensor probe is coupled to the counter module EVC using a length of flexible cable.

In some embodiments, the first gas meter body comprises a gas meter body of a first size, and wherein the second gas meter body comprises a gas meter body of a second size.

In some embodiments, the first gas meter body comprises a gas meter body of a first model line, and wherein the second gas meter body comprises a gas meter body of a second model line.

In some embodiments, the sensor probe aperture of the adapter sleeve has a longitudinal axis that is parallel to the longitudinal axis of the adapter sleeve.

In some embodiments, the longitudinal axis of the sensor probe aperture is offset from the longitudinal axis of the adapter sleeve.

In some embodiments, the outer surface of the sensor probe comprises one or more engagement protrusions, wherein when the sensor probe is positioned within the adapter sleeve, the engagement protrusions inhibit the adapter sleeve from rotating relative to the sensor probe.

In some embodiments, the outer surface of the sensor probe comprises one or more alignment protrusions, the sensor probe aperture of the adapter sleeve comprises one or more alignment grooves, and wherein the alignment groves are configured to receive the one or more alignment protrusions such that the sensor probe aperture is inhibited from being inserted into the adapter sleeve unless the alignment protrusions and the alignment grooves are aligned.

In some embodiments, the adapter sleeve has an outer diameter at the first end of the adapter sleeve that is greater than the outer diameter of the adapter sleeve at the second end of the adapter sleeve.

In accordance with another broad aspect, there is provided a magnetic sensor assembly for rotary gas meters, the assembly comprising: a counter module EVC; a base coupling member operatively coupled to the counter module EVC; a first magnetic sensor probe configured to be releasably secured within an aperture of a first gas meter body, the first sensor probe having a first end, a second end, and a probe coupling member extending from the first end of the first sensor probe, the probe coupling member of the first sensor probe being releasably engagable with the base coupling member; and a second magnetic sensor probe configured to be releasably secured within an aperture of a second gas meter body, the second sensor probe having a first end, a second end, and a probe coupling member extending from the first end of the second sensor probe, the probe coupling member of the second sensor probe being releasably engagable with the base coupling member; wherein, in a first configuration, the probe coupling member of the first sensor probe is engaged with the base coupling member to operatively couple the first sensor probe and the counter module EVC, and the counter module EVC may be coupled to the first gas meter body with the sensor probe positioned within the aperture of the first gas meter body for sensing rotation of a counter drive shaft of the first gas meter body, and wherein, in a second configuration, the probe coupling member of the second sensor probe is engaged with the base coupling member to operatively couple the second sensor probe and the counter module EVC, and the counter module EVC may be coupled to the second gas meter body with the sensor probe positioned within the aperture of the second gas meter body for sensing rotation of a counter drive shaft of the second gas meter body.

In some embodiments, the base coupling member is coupled to the counter module EVC using a length of flexible cable.

In some embodiments, the probe coupling member of at least one of the first and second sensor probes is coupled to the first end of that sensor probe using a length of flexible cable.

In some embodiments, the first gas meter body comprises a gas meter body of a first size, and wherein the second gas meter body comprises a gas meter body of a second size.

In some embodiments, the first gas meter body comprises a gas meter body of a first model line, and wherein the second gas meter body comprises a gas meter body of a second model line.

In some embodiments, the first sensor probe has a generally cylindrical outer surface extending between the first and second ends of the first sensor probe, and an outer diameter at the second end, the second sensor probe has an outer surface extending between the first and second ends of the second sensor probe, and an outer diameter at the second end that is greater than the outer diameter at the second end of the first sensor probe.

In some embodiments, the aperture of the second gas meter body has a diameter that is greater than a diameter of the aperture of the first gas meter body.

In some embodiments, the second sensor probe has an outer diameter at the first end of the second sensor probe that is greater than the outer diameter of the second sensor probe at the second end of the second sensor probe.

In some embodiments, the base coupling member comprises a female connector, and wherein the probe coupling members of the first and second sensor probes each comprise a male connector.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below. For example, there may be provided a rotary gas meter comprising a magnetic sensor assembly coupled thereto.

BRIEF DESCRIPTION OF THE DRAWINGS

For a better understanding of the described embodiments and to show more clearly how they may be carried into effect, reference will now be made, by way of example, to the accompanying drawings in which:

FIG. 6 is a perspective view of a magnetic sensor probe housing, in accordance with one embodiment;

FIG. 7 is an end view of the magnetic sensor probe housing of FIG. 6;

FIG. 8 is a longitudinal section view of the magnetic sensor probe housing of FIG. 6, taken along line 8-8 in FIG. 7;

FIG. 9 is a perspective view of a magnetic sensor probe housing, in accordance with another embodiment;

FIG. 10 is an end view of the magnetic sensor probe housing of FIG. 9;

FIG. 11 is a longitudinal section view of the magnetic sensor probe housing of FIG. 9, taken along line 11-11 in FIG. 10;

FIG. 19 is a perspective view of the counter module EVC and the first magnetic sensor probe of FIG. 18;

FIG. 20 is a perspective view of the counter module EVC and sensor probe of FIG. 19, with the magnetic sensor probe coupled to the counter module EVC;

FIG. 21 is a perspective view of the counter module EVC and the second magnetic sensor probe of FIG. 18;

FIG. 22 is a perspective view of the counter module EVC and sensor probe of FIG. 21, with the magnetic sensor probe coupled to the counter module EVC;

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

While the apparatus and methods disclosed herein are described specifically in relation to conventional positive displacement rotary gas meters, it will be appreciated that the apparatus and methods may alternatively be used with other types of gas meters.

Figure 1B:
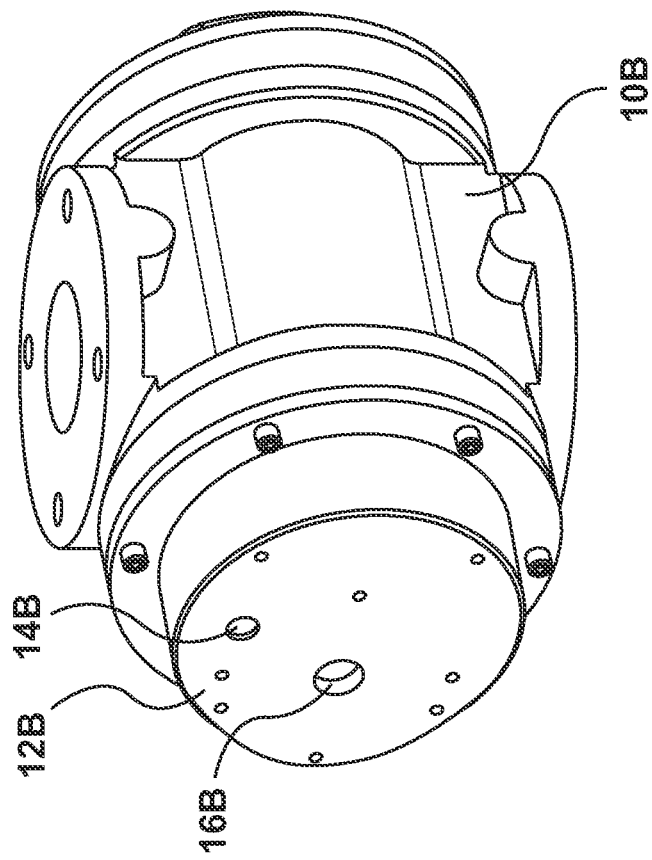
FIGS. 1A and 1B are perspective views of a first gas meter body and a second gas meter body.
Figure 1A:
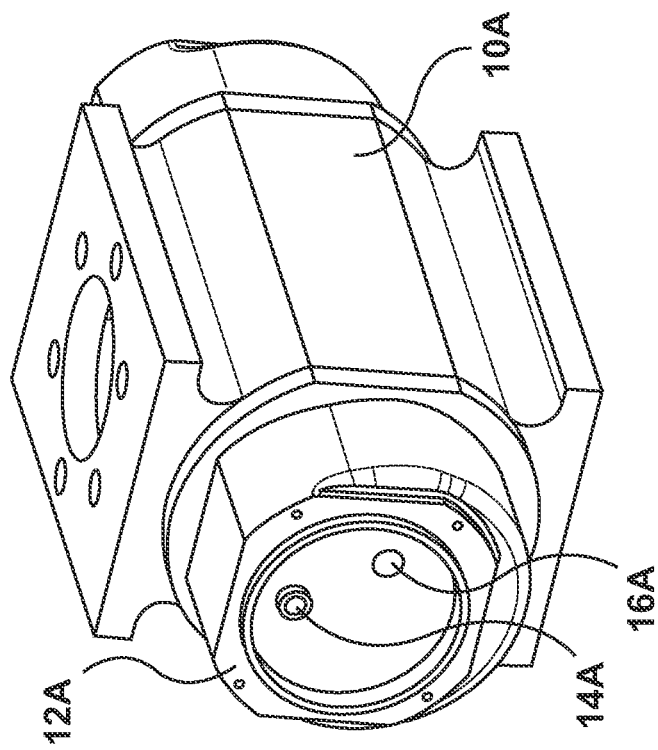

FIGS. 1A and 1B illustrate two examples of positive displacement rotary gas meter bodies. Gas meter body 10A has an aperture 16A for providing access to a counter drive shaft of the gas meter, and an aperture 14A for receiving a temperature probe. As used herein, a counter drive shaft is any shaft of the gas meter body that rotates proportionally to the rotation of the impellers (e.g. lobed figure-eight impellers, or other rotors) and may be used to drive a counter module EVC. For example, a rotor shaft may be used as a counter drive shaft. Gas meter body 10A also has a mounting surface 12A to which a counter module EVC may be secured.

Figure 2:
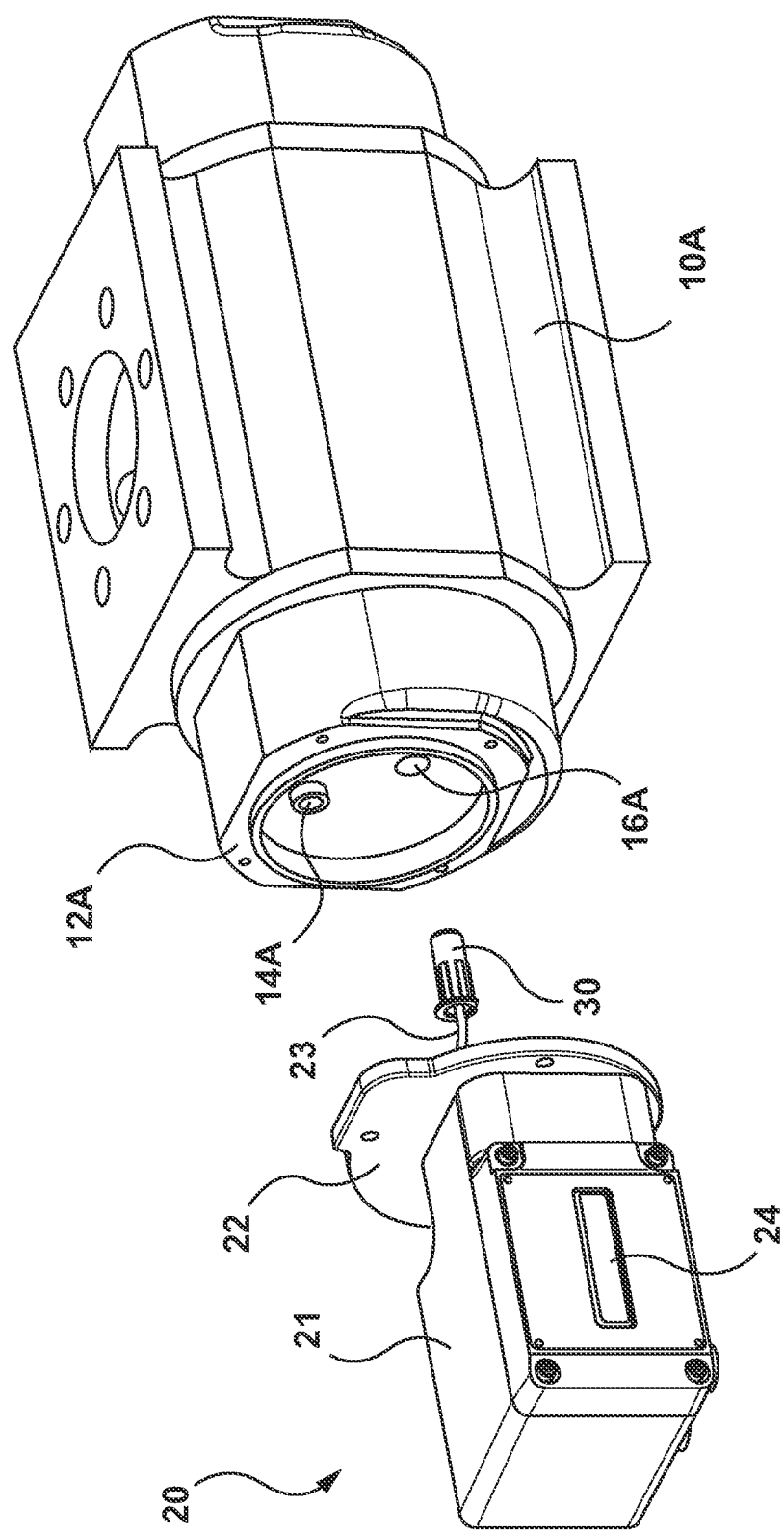
FIG. 2 is a perspective view of a counter module EVC and the first gas meter body of FIG. 1A.

FIG. 2 illustrates a counter module EVC 20 and a gas meter body 10A. Counter module EVC 20 has a magnetic sensor probe 30 that may be positioned within aperture 16A of gas meter body 10A for sensing the rotation of the counter drive shaft. For example, a Wiegand magnet and corresponding magnet sensor may be used, although any suitable tracking system may alternatively be used.

A display 24 may be provided on counter module EVC 20 for outputting the measured amount of gas that has traveled through the gas meter. Counter module EVC 20 may also have a temperature probe (not shown) for insertion into aperture 14A, allowing counter module EVC 20 to provide a temperature-corrected measurement of the volume of gas that has flowed through the gas meter, as is conventionally known.

For example, counter module EVC 20 may be an AdEM™ series counter module EVC as available from Romet Limited.

As illustrated in FIG. 2, magnetic sensor probe 30 is coupled to the body 21 of counter module EVC 20 using a length of flexible cabling 23. It is understood that the body 21 houses and supports EVC components (not shown) within the body 21 and the cabling 23 couples the magnetic sensor probe 30 thereto. This arrangement allows sensor probe 30 to be easily moved relative to the mounting surface 22 of counter module EVC 20 (limited by the length of the cable 23). An advantage of this arrangement is that counter module EVC 20 may be used with gas meter bodies having different relative locations of their common mounting surface and counter drive shafts (as the magnetic sensor probe 30 may be easily repositioned relative to the mounting surface 22). For example, after positioning sensor probe 30 within aperture 16A of gas meter body 10A, counter module EVC 20 may be coupled directly to gas meter body 10A (e.g. by securing mounting surface 22 of counter module EVC 20 to mounting surface 12A).

While counter module EVC 20 may be used with gas meter bodies having different relative locations of their common mounting surface and counter drive shafts, magnetic sensor probe 30 may not be compatible with all gas meter bodies. For example, different gas meter bodies (e.g. different rates sized of gas meter bodies, and/or different model lines produced by a manufacturer of gas meter bodies) may have differing sizes of apertures 16 for receiving magnetic sensor probes. Additionally, or alternatively, different gas meter bodies may have apertures 16 with different internal profiles.

Typically, the magnetic sensor probe of a counter module EVC is 'hard wired' to the counter module EVC, and it may be difficult and/or inadvisable to modify and/or replace the sensor probe. For example, cutting off and re-wiring a new sensor probe to the counter module EVC may void a warranty provided by the manufacturer of the counter module EVC. Additionally, or alternatively, improper re-wiring of a new sensor probe to a counter module EVC may impact the metrological validity of the counter module EVC.

Figure 3:
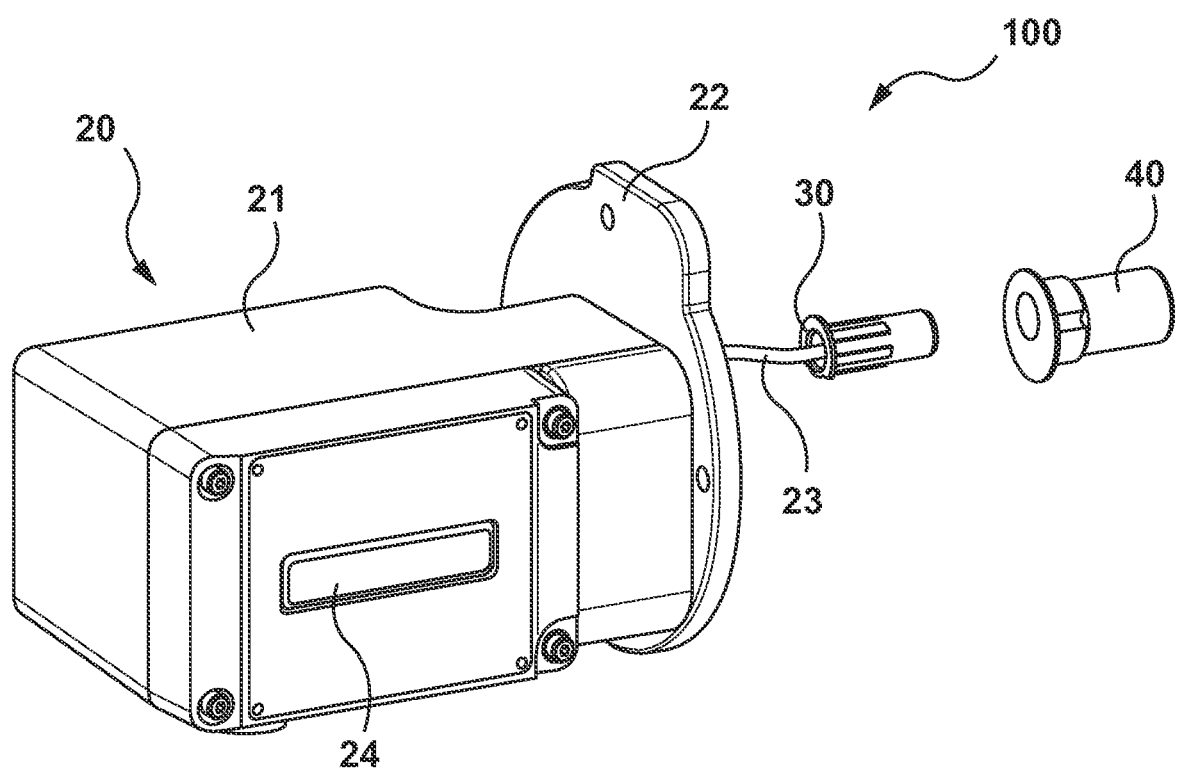
FIG. 3 is a perspective view of the counter module EVC of FIG. 2 and an adapter sleeve.
Figure 4:
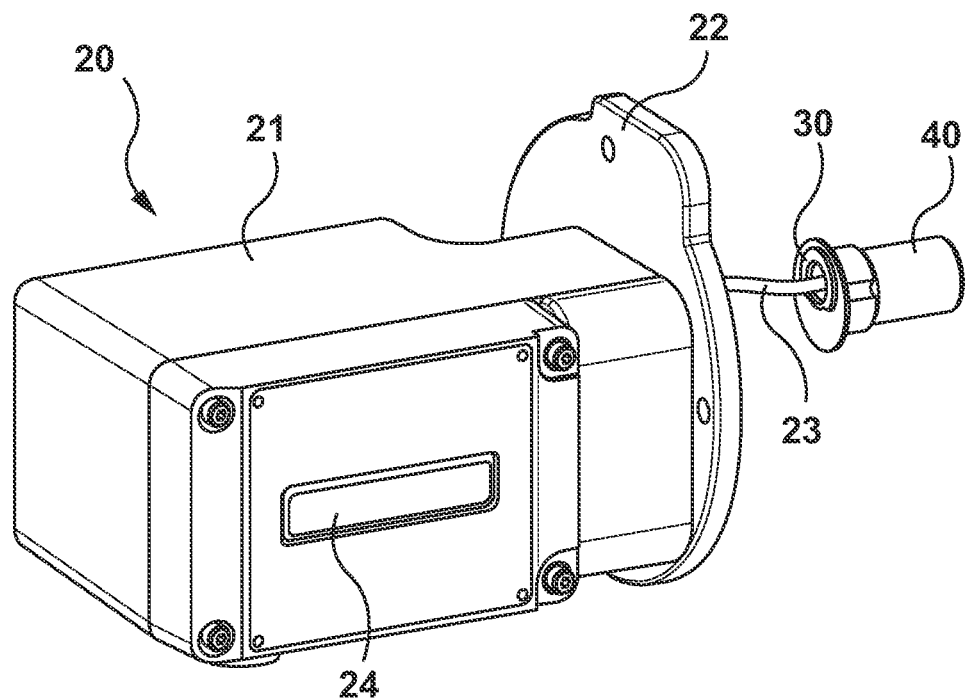
FIG. 4 is a perspective view of the counter module EVC and adapter sleeve of FIG. 3, with a magnetic sensor probe of the counter module EVC positioned within the adapter sleeve.

FIGS. 3 and 4 illustrate a magnetic sensor assembly, referred to generally as 100, that may be compatible with a greater variety of different gas meter bodies. As shown in FIG. 3, assembly 100 includes a counter module EVC 20, magnetic sensor probe 30, and at least one adapter sleeve 40.

Each adapter sleeve 40 includes a sensor probe aperture 44 configured to receive the sensor probe 30 within the adapter sleeve. When sensor probe 30 is positioned within adapter sleeve 40 (e.g. as illustrated in FIG. 4), the outer surface of the adapter sleeve 40 becomes the effective outer surface of the sensor probe 30.

Figure 5:
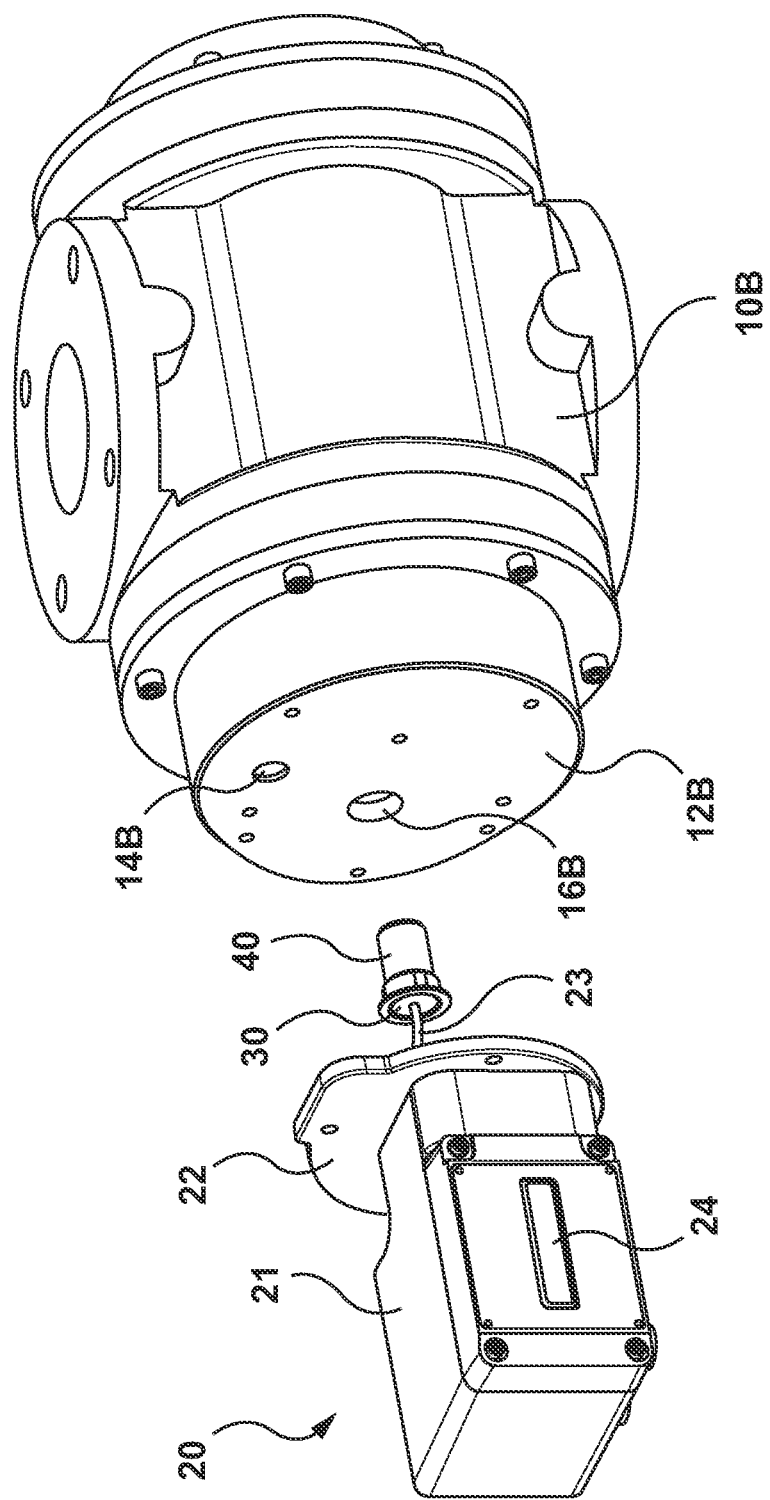
FIG. 5 is a perspective view of the counter module EVC and adapter sleeve of FIG. 4 and the second gas meter body of FIG. 1B.

As illustrated in FIG. 5, with the sensor probe 30 positioned within an adapter sleeve 40, the adapter sleeve 40 may be positioned within an aperture 16B of second gas meter body 10B, and the counter module EVC 20 may be coupled to the second gas meter body 10B (e.g. by securing mounting surface 22 of counter module EVC 20 to mounting surface 12B).

Alternatively, as illustrated in FIG. 2, the counter module EVC 20 may be coupled to the first gas meter body 10A (e.g. by securing mounting surface 22 of counter module EVC 20 to mounting surface 12A) with the sensor probe 30 positioned within aperture 16A of first gas meter body 10A (i.e. without adapter sleeve 40).

Optionally, sensor probe aperture 44 may be configured to provide a 'friction' fit, allowing sensor probe 30 to be releasably secured within sensor probe aperture 44 manually, and preferably without the use of tools.

The ability to use the same magnetic sensor assembly 100 with gas meter bodies 10 having different sizes, positions, and/or internal profiles of magnetic sensor apertures 16 may have one or more advantages.

For example, the ability to use a 'universal' magnetic sensor assembly 100 with multiple gas meter bodies may reduce the number of different counter module EVCs that are required to be brought to a customer's facility when installing and/or repairing counter module EVCs, as the same parts may be used with a wide variety of gas meters.

For example, a facility may have a number of gas meter bodies that are part of a first model line of meter bodies produced by a first manufacturer, and the same facility may also have gas meter bodies that are produced by a second manufacturer. A service technician dispatched to the facility may not have an accurate count of the number of different types of gas meter bodies present at the facility, and/or may not know how many gas meter bodies of each type(s) require service and/or repair. Accordingly, the technician may be required to bring a number of different counter module EVCs, and/or may require multiple trips to the facility (e.g. one trip to count the number of different meter bodies and/or meter body type(s), and a second trip to bring the correct amount of compatible counter module EVCs.)

FIGS. 6-8 illustrate an example of a housing of a magnetic sensor probe 30. Housing 39A has a first end 31, a second end 32, a generally cylindrical outer surface 33 extending between the first and second ends 31, 32 of the housing, and a longitudinal axis 35. One or more magnetic sensing devices (not shown) are provided within an aperture 34 of the housing 39A.

Optionally, as illustrated in FIG. 6, the outer surface 33 of housing 39A (and thus, the outer surface of magnetic sensor probe 30) may have one or more engagement protrusions 36. Preferably, the engagement protrusions 36 are configured to assist in securing magnetic sensor probe 30 within a sensor probe aperture 44 of an adapter sleeve 40, and/or within an aperture 16 of a gas meter body 10. Additionally, or alternatively, the outer surface 33 of housing 39A (and thus, the outer surface of magnetic sensor probe 30) may have one or more alignment protrusions. Preferably, the alignment protrusions are configured to assist in aligning magnetic sensor probe 30 within a sensor probe aperture 44 of an adapter sleeve 40, and/or within an aperture 16 of a gas meter body 10. In some embodiments, engagement protrusions 36 may also function as alignment protrusions.

Magnetic sensor probe 30 and its housing 39A may have any suitable dimensions. For example, outer surface 33 of housing 39A may have a diameter $d_1$ of about 0.50 inches or about 1.27 centimeters, and a length between the first and second ends 31, 32 of about 1.4 inches or about 3.56 centimeters.

For example, magnetic sensor probe 30 may be configured to be inserted into an aperture provided on a B3 series gas meter body as available from Dresser GE Oil & Gas.

FIGS. 9-11 illustrate another example of a housing of a magnetic sensor probe 30. Housing 39B has a first end 31, a second end 32, and an outer surface 33 extending between the first and second ends 31, 32 of the housing, and a longitudinal axis 35. One or more magnetic sensing devices (not shown) are provided within an aperture 34 of the housing 39A.

As illustrated in FIG. 11, the first end 31 of housing 39B may have a diameter $d_1$ that is greater than a diameter $d_2$ of the second end 32 of housing 39B. Thus, housing 39B may allow magnetic sensor probe 30 (positioned within adapter sleeve 40) to be secured within an aperture 16 (of a gas meter body 10) that has a tapered profile.

Magnetic sensor probe 30 and its housing 39B may have any suitable dimensions. For example, diameter $d_1$ of first end 31 may be about 1.00 inches or about 2.54 centimeters, and a length between the first and second ends 31, 32 of about 1.5 inches or about 3.81 centimeters.

Figure 13:
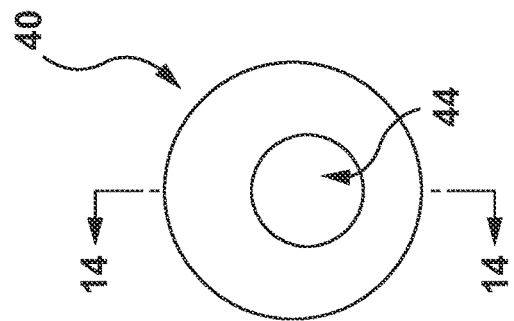
FIG. 13 is an end view of the adapter sleeve of FIG. 12.
Figure 12:
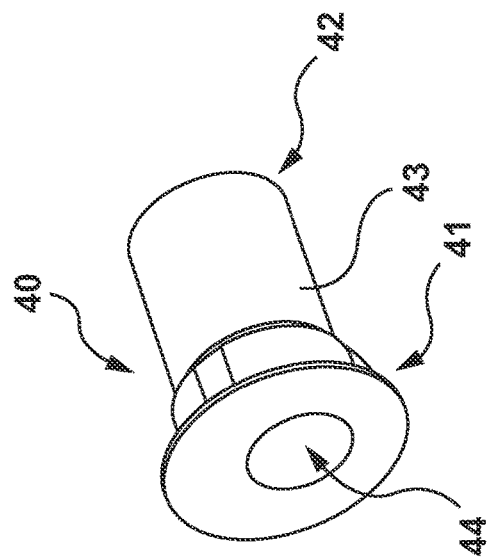
FIG. 12 is a perspective view of an adapter sleeve, in accordance with one embodiment.
Figure 14:
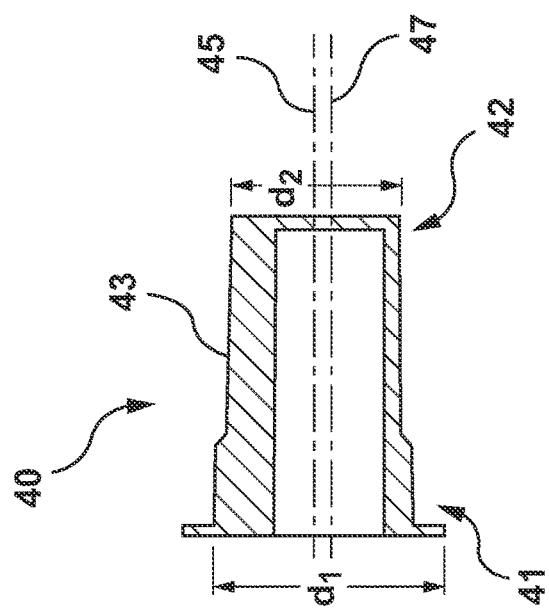
FIG. 14 is a longitudinal section view of the adapter sleeve of FIG. 12, taken along line 14-14 in FIG. 13.

FIGS. 12-14 illustrate an example of an adapter sleeve 40. In the illustrated example, adapter sleeve 40 has a first end 41, a second end 42, and an outer surface 43 extending between the first and second ends 41, 42 of the adapter sleeve. Adapter sleeve 40 also has a sensor probe aperture 44 configured to releasably receive sensor probe 30 within the adapter sleeve. In the illustrated example, sensor probe aperture 44 extends from the first end 41 towards the second end 42 of the adapter sleeve 40.

In the illustrated example, adapter sleeve 40 has a longitudinal axis 45, and sensor probe aperture 44 has a longitudinal axis 47 that is offset from the longitudinal axis 45 of the adapter sleeve 40. Such an arrangement may allow a magnetic sensor probe 30 (and its magnetic sensing devices) to be positioned non-centrally within the adapter sleeve 40, and ultimately allowing the sensor probe to be secured non-centrally within an aperture 16 of a gas meter body 10.

In one or more alternative embodiments (not shown), longitudinal axis 47 of sensor probe aperture 44 may be at an angle to longitudinal axis 45 of the adapter sleeve 40.

In one or more alternative embodiments (not shown), the inner surface of sensor probe aperture 44 may be provided with one or more alignment recesses (not shown) for receiving one or more alignment protrusions provided on an outer surface of magnetic sensor probe 30 as magnetic sensor probe 30 is inserted into sensor probe aperture 44. In such an arrangement, when the sensor probe is positioned within the adapter sleeve, the alignment protrusions and the alignment recesses may cooperatively inhibit the adapter sleeve 40 from rotating relative to the sensor probe 30. Additionally, or alternatively, the alignment protrusions and the alignment recesses may cooperatively inhibit the sensor probe from being inserted into the adapter sleeve unless the alignment protrusions and the alignment grooves are aligned.

As illustrated in FIG. 14, the first end 41 of adapter sleeve 40 may have a diameter $d_1$ that is greater than a diameter $d_2$ of the second end 42 of adapter sleeve 40. Thus, using adapter sleeve 40 may allow a magnetic sensor probe 30 (positioned within adapter sleeve 40) that has a generally cylindrical profile to be secured within an aperture 16 (of a gas meter body 10) that has a tapered profile.

Adapter sleeve 40 may have any suitable dimensions. For example, outer surface 43 may have a diameter $d_1$ of about 1.00 inches or about 2.54 centimeters, and a length between the first and second ends 41, 42 of about 1.5 inches or about 3.81 centimeters.

For example, adapter sleeve 40 may be configured to be inserted into an aperture provided on a RM series and/or RMT series gas meter body as available from Romet Limited. It will be appreciated that an adapter sleeve configured for one type of gas meter body may also be compatible with another type of gas meter body. For example, an adapter sleeve 40 configured to be inserted into an aperture provided on an RM and/or RMT gas meter body as available from Romet Limited may also be capable of being inserted into an aperture provided on a LMMA series gas meter body as available from Dresser GE Oil & Gas.

Adapter sleeve 40 and magnetic sensor housings 39A, 39B may be made from any suitable material. For example, they may be made from plastic, such as low-density polyethylene (LDPE). In some embodiments, adapter sleeve 40 may be made from the same material as housing 39.

Figure 15:
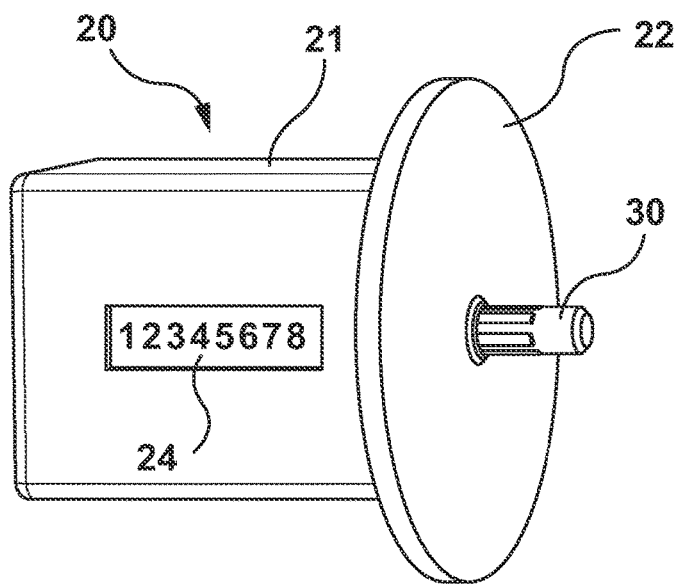
FIG. 15 is a perspective view of a counter module EVC in accordance with another embodiment.
Figure 16:
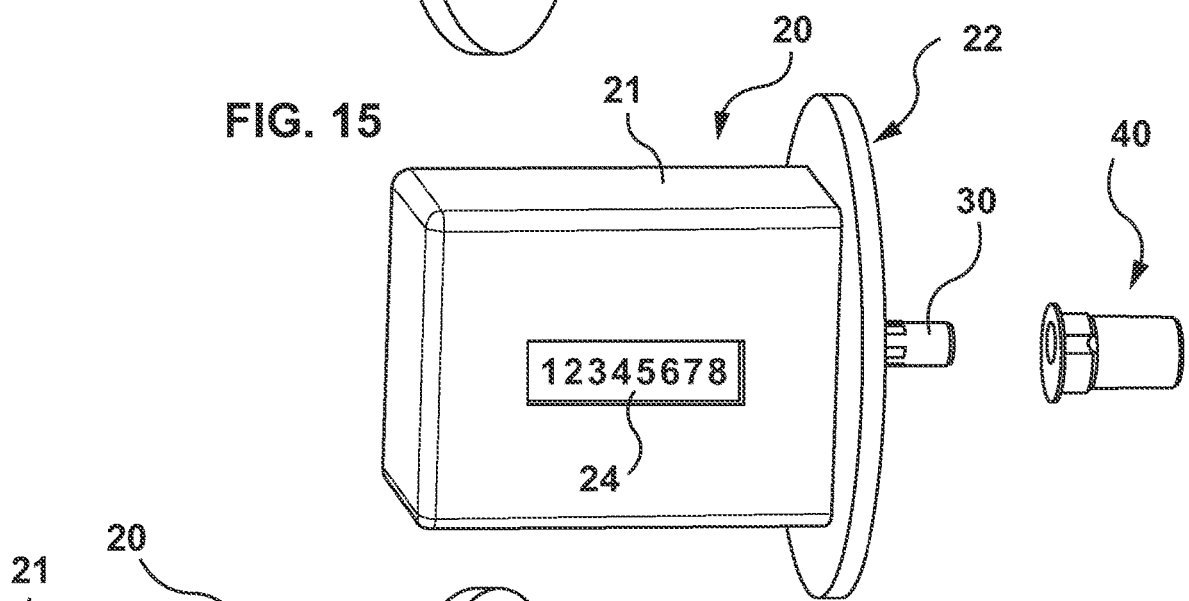
FIG. 16 is a perspective view of the counter module EVC of FIG. 15 and an adapter sleeve.
Figure 17:
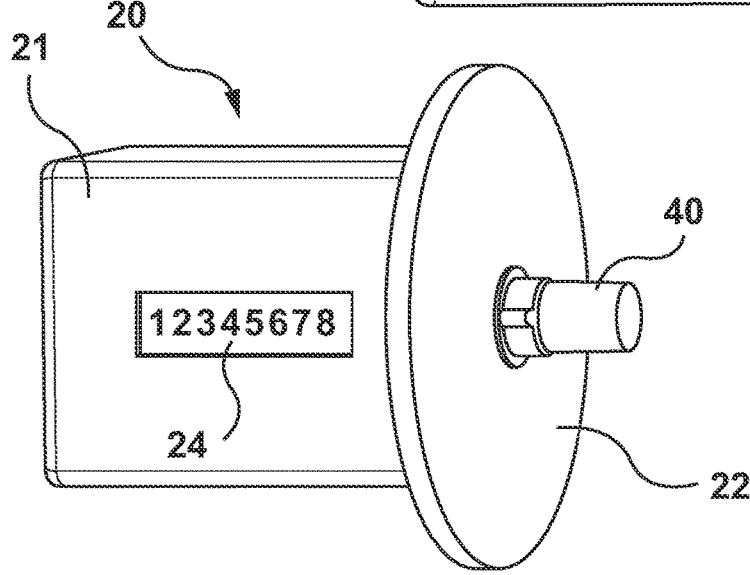
FIG. 17 is a perspective view of the counter module EVC and adapter sleeve of FIG. 16, with a magnetic sensor probe of the counter module EVC positioned within the adapter sleeve.

In the examples illustrated in FIGS. 2-5, a magnetic sensor probe is coupled to a counter module EVC using a length of flexible cabling. Alternatively, a magnetic sensor probe may be rigidly coupled to a counter module EVC. FIG. 15 illustrates an example of a counter module EVC 20 with a magnetic sensor probe 30 rigidly coupled to the body 21 of the counter module EVC 20. In this arrangement, sensor probe 30 is in a fixed location relative to the mounting surface 22 of counter module EVC 20. As illustrated in FIGS. 16 and 17, when sensor probe 30 is positioned within adapter sleeve 40 (e.g. as illustrated in FIG. 17), the outer surface of the adapter sleeve 40 becomes the effective outer surface of the sensor probe 30.

Figure 18:
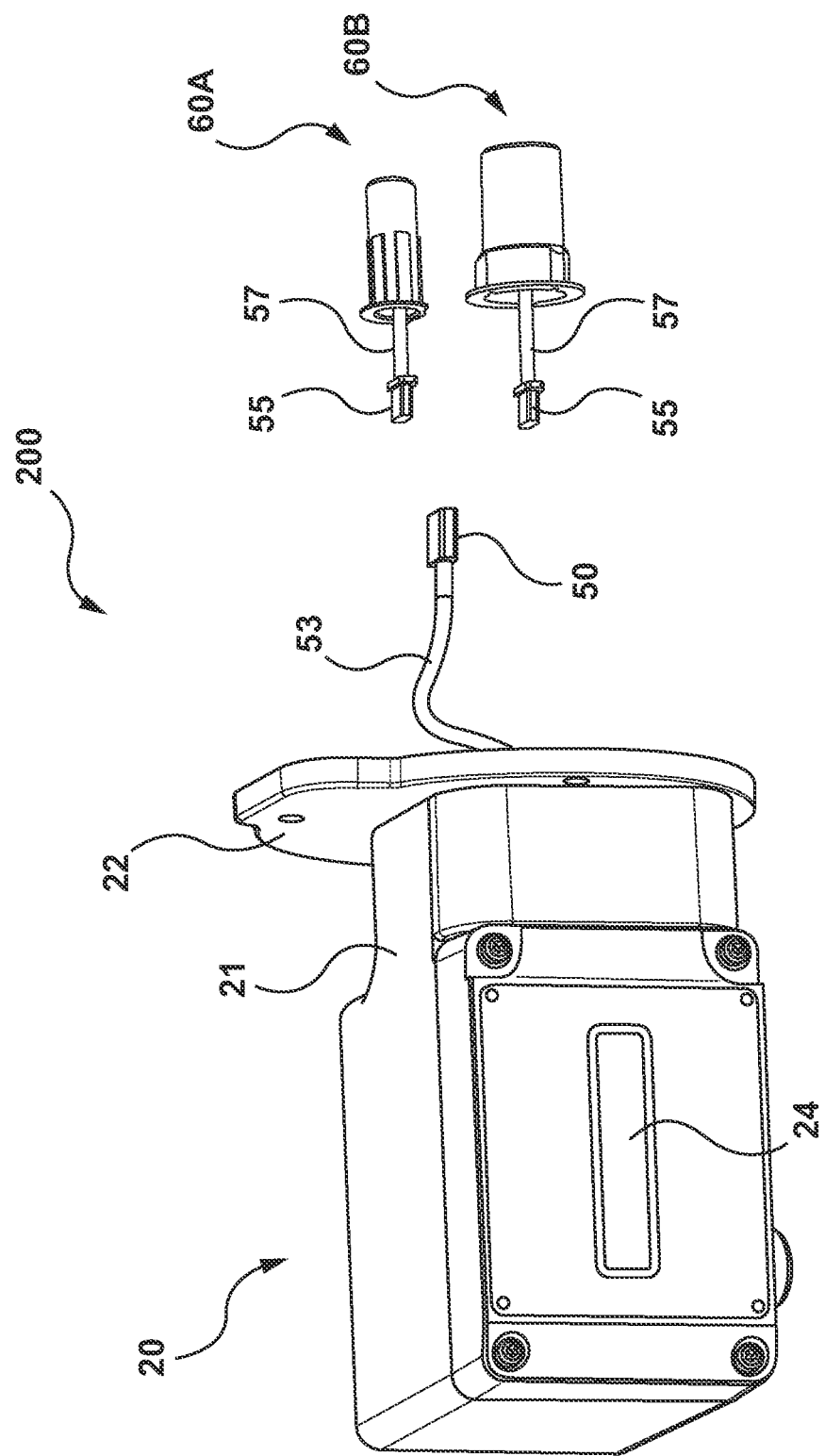
FIG. 18 is a perspective view of an counter module EVC in accordance with another embodiment, a first magnetic sensor probe, and a second magnetic sensor probe.

FIG. 18 illustrates another embodiment of a magnetic sensor assembly, referred to generally as 200, that may also be compatible with a greater variety of different gas meter bodies. As shown in FIG. 18, assembly 200 includes a counter module EVC 20, a base coupling member 50, a first magnetic sensor probe 60A, and a second magnetic sensor probe 60B.

In the illustrated example, base coupling member 50 is attached to the counter module EVC 20 using a length of flexible cabling 53. In alternative embodiments, coupling member 50 may be rigidly coupled to counter module EVC 20.

Each sensor probe 60A, 60B includes a probe coupling member 55 that is releasably engagable with the base coupling member 50 of the counter module EVC 20. Preferably, the base coupling member 50 and the probe coupling members 55 are configured to allow coupling member 50 to be secured to a coupling member 55 without the use of tools.

Preferably, when coupling member 50 and a coupling member 55 are secured to each other the resulting connection inhibits or prevents dust and/or water from interfering with the electrical connection between the counter module EVC and the magnetic sensor probe. For example, the mated coupling members may have an Ingress Protection rating of at least IP65, as defined in international standard EN 60529 (British BS EN 60529:1992, European IEC 60509:1989).

In the illustrated examples, coupling member 50 is a female connector and coupling members 55 are male connectors. It will be appreciated that, in alternative embodiments, coupling member 50 may be a male connector and coupling members 55 may be female connectors.

As illustrated in FIGS. 19 and 20, in a first configuration the base coupling member 50 may be engaged with the first magnetic sensor probe 60A to operatively couple the first sensor probe and the counter module EVC. In this configuration, the first magnetic sensor probe 60A may be positioned within an aperture 16A of first gas meter body 10A, and the counter module EVC 20 may be coupled to the first gas meter body 10A (e.g. by securing mounting surface 22 of counter module EVC 20 to mounting surface 12A).

Alternatively, as illustrated in FIGS. 21 and 22, in another configuration the base coupling member 50 may be engaged with the second magnetic sensor probe 60B to operatively couple the second sensor probe and the counter module EVC. In this configuration, the second magnetic sensor probe 60B may be positioned within an aperture 16B of second gas meter body 10B, and the counter module EVC 20 may be coupled to the second gas meter body 10B (e.g. by securing mounting surface 22 of counter module EVC 20 to mounting surface 12B).

As discussed above with respect to magnetic sensor assembly 100, the ability to use the same magnetic sensor assembly 200 with gas meter bodies 10 having different sizes, positions, and/or internal profiles of magnetic sensor apertures 16 may have one or more advantages.

Figure 24:
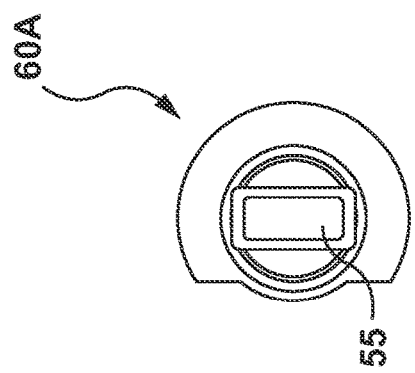
FIG. 24 is an end view of the sensor probe of FIG. 23.
Figure 23:
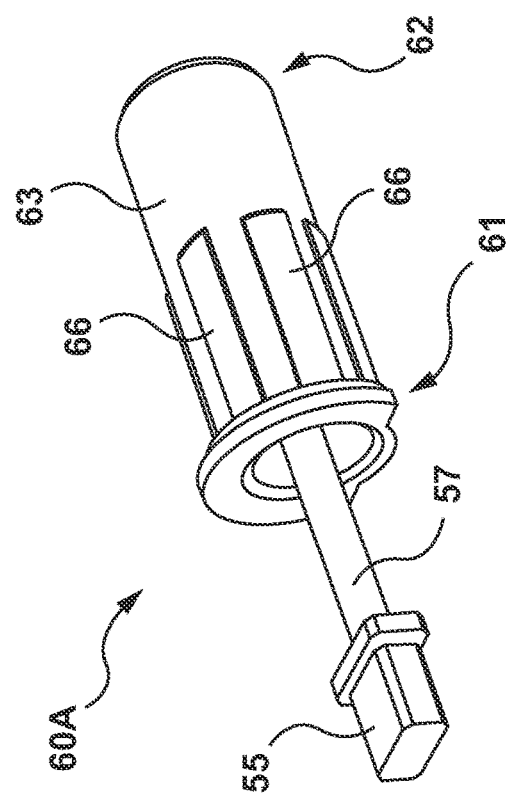
FIG. 23 is a perspective view of the first magnetic sensor probe of FIG. 18.
Figure 25:
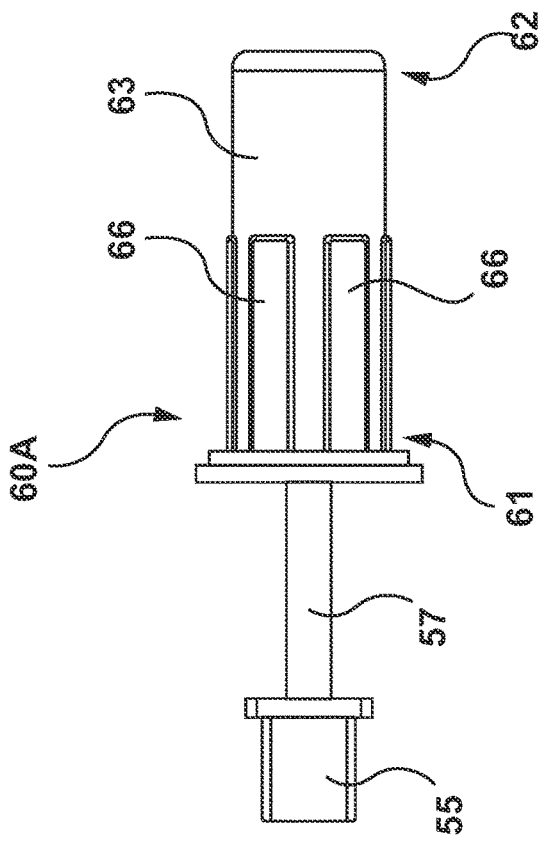
FIG. 25 is a side view of the sensor probe of FIG. 23.

FIGS. 23-25 illustrate an example of a magnetic sensor probe 60A. In the illustrated example, sensor probe 60A has a first end 61, a second end 62, and an outer surface 63 extending between the first and second ends 61, 62 of the sensor probe. Sensor probe 60A also includes a probe coupling member 55 extending from the first end 61 of the first sensor probe.

In the illustrated example, coupling member 55 is attached to the sensor probe 60A using a length of flexible cabling 57. In alternative embodiments, coupling member 55 may be rigidly coupled to sensor probe 60A.

Optionally, as illustrated in FIGS. 23 and 25, the outer surface 63 of sensor probe 60A may have one or more engagement protrusions 66. Preferably, the engagement protrusions 66 are configured to assist in securing sensor probe 60A within an aperture 16A of a gas meter body 10A.

Figure 27:
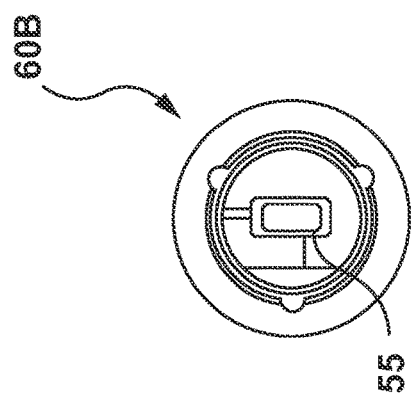
FIG. 27 is an end view of the sensor probe of FIG. 26.
Figure 26:
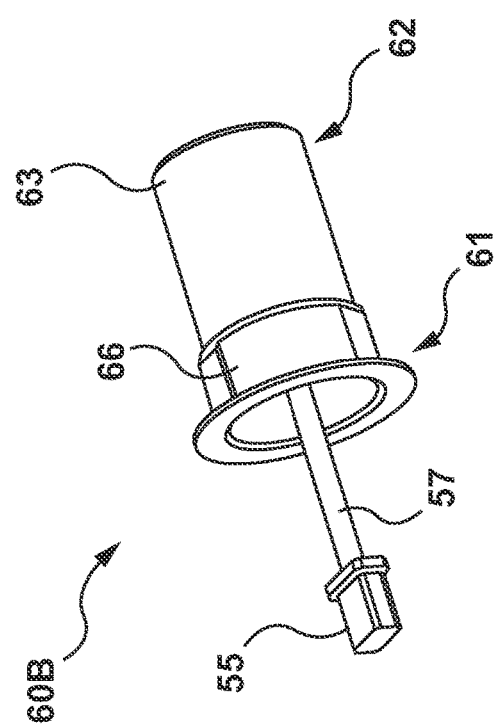
FIG. 26 is a perspective view of the second magnetic sensor probe of FIG. 18.
Figure 28:
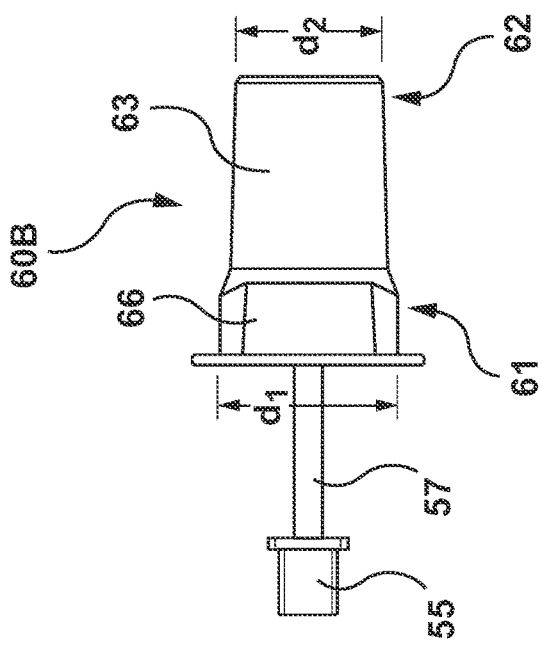
FIG. 28 is a side view of the sensor probe of FIG. 26.

FIGS. 26-28 illustrate an example of a second magnetic sensor probe 60B. In the illustrated example, sensor probe 60B has a first end 61, a second end 62, and an outer surface 63 extending between the first and second ends 61, 62 of the sensor probe. Sensor probe 60B also includes a probe coupling member 55 extending from the first end 61 of the second sensor probe.

In the illustrated example, coupling member 55 is attached to the sensor probe 60B using a length of flexible cabling 57. In alternative embodiments, coupling member 55 may be rigidly coupled to sensor probe 60B.

Optionally, as illustrated in FIGS. 26 and 28, the outer surface 63 of sensor probe 60B may have one or more engagement protrusions 66. Preferably, the engagement protrusions 66 are configured to assist in securing sensor probe 60B within an aperture 16B of a gas meter body 10B.

As illustrated in FIG. 28, the first end 61 of sensor probe 60B may have a diameter $d_1$ that is greater than a diameter $d_2$ of the second end 62 of sensor probe 60B. Thus, using sensor probe 60B may allow counter module EVC 20 to be used with a gas meter body 10 that has an aperture 16 with a tapered profile.

The outer surfaces of sensor probes 60A, 60B may be made from any suitable material. For example, they may be made from plastic, such as low-density polyethylene (LDPE).

For assemblies 100 and 200, it will be appreciated that counter module EVC 20 may need to be programmed (or reprogrammed) based on the gas meter body to which it is coupled. For example, counter module EVC may include two or more sets of sensor configuration data stored in e.g. firmware, and an appropriate set of configuration data may be selected based on the gas meter body in which the magnetic sensor probe (e.g., probe 30, 60A, 60B) is positioned.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

The invention claimed is:

1. A magnetic sensor assembly for rotary gas meters, the assembly comprising:
   a counter module electronic volume corrector ("EVC");
   a magnetic sensor probe operatively coupled to the counter module EVC and configured to be releasably secured within an aperture of a first gas meter body,
      the sensor probe having a first end, a second end, a generally cylindrical outer surface extending between the first and second ends, an outer diameter at the second end, and a longitudinal axis; and
   an adapter sleeve,
      the adapter sleeve having a first end, a second end, an outer surface extending between the first and second ends of the adapter sleeve, an outer diameter at the second end of the adapter sleeve, a longitudinal axis, and a sensor probe aperture extending from the first end of the adapter sleeve towards the second end of the adapter sleeve,
      the sensor probe aperture being configured to receive the sensor probe within the adapter sleeve,
      the adapter sleeve being configured to be releasably secured within an aperture of a second gas meter body, the aperture of the second gas meter body having a diameter that is greater than a diameter of the aperture of the first gas meter body,
   wherein, in a first configuration, the counter module EVC may be coupled to the first gas meter body with the sensor probe positioned within the aperture of the first gas meter body for sensing rotation of a counter drive shaft of the first gas meter body, and
   wherein, in a second configuration, the counter module EVC may be coupled to the second gas meter body with the sensor probe positioned within the adapter sleeve, and the adapter sleeve positioned within the aperture of the second gas meter body for sensing rotation of a counter drive shaft of the second gas meter body.

2. The assembly of claim 1, wherein the sensor probe is coupled to the counter module EVC using a length of flexible cable.

3. The assembly of claim 1, wherein the first gas meter body comprises a gas meter body of a first size, and wherein the second gas meter body comprises a gas meter body of a second size.

4. The assembly of claim 1, wherein the first gas meter body comprises a gas meter body of a first model line, and wherein the second gas meter body comprises a gas meter body of a second model line.

5. The assembly of claim 1, wherein the sensor probe aperture of the adapter sleeve has a longitudinal axis that is parallel to the longitudinal axis of the adapter sleeve.

6. The assembly of claim 5, wherein the longitudinal axis of the sensor probe aperture is offset from the longitudinal axis of the adapter sleeve.

7. The assembly of claim 1, wherein the outer surface of the sensor probe comprises one or more engagement protrusions, wherein when the sensor probe is positioned within the adapter sleeve, the engagement protrusions inhibit the adapter sleeve from rotating relative to the sensor probe.

8. The assembly of claim 1, wherein the outer surface of the sensor probe comprises one or more alignment protrusions, the sensor probe aperture of the adapter sleeve comprises one or more alignment grooves, and wherein the alignment groves are configured to receive the one or more alignment protrusions such that the sensor probe aperture is inhibited from being inserted into the adapter sleeve unless the alignment protrusions and the alignment grooves are aligned.

9. The assembly of claim 1, wherein the adapter sleeve has an outer diameter at the first end of the adapter sleeve that is greater than the outer diameter of the adapter sleeve at the second end of the adapter sleeve.

10. A magnetic sensor assembly for rotary gas meters, the assembly comprising:
a counter module EVC;
a base coupling member operatively coupled to the counter module EVC;
a first magnetic sensor probe configured to be releasably secured within an aperture of a first gas meter body, the first sensor probe having a first end, a second end, and a probe coupling member extending from the first end of the first sensor probe, the probe coupling member of the first sensor probe being releasably engagable with the base coupling member; and
a second magnetic sensor probe configured to be releasably secured within an aperture of a second gas meter body,
the second sensor probe having a first end, a second end, and a probe coupling member extending from the first end of the second sensor probe, the probe coupling member of the second sensor probe being releasably engagable with the base coupling member;
wherein, in a first configuration, the probe coupling member of the first sensor probe is engaged with the base coupling member to operatively couple the first sensor probe and the counter module EVC, and the counter module EVC may be coupled to the first gas meter body with the sensor probe positioned within the aperture of the first gas meter body for sensing rotation of a counter drive shaft of the first gas meter body, and
wherein, in a second configuration, the probe coupling member of the second sensor probe is engaged with the base coupling member to operatively couple the second sensor probe and the counter module EVC, and the counter module EVC may be coupled to the second gas meter body with the sensor probe positioned within the aperture of the second gas meter body for sensing rotation of a counter drive shaft of the second gas meter body.

11. The assembly of claim 10, wherein the base coupling member is coupled to the counter module EVC using a length of flexible cable.

12. The assembly of claim 10, wherein the probe coupling member of at least one of the first and second sensor probes is coupled to the first end of that sensor probe using a length of flexible cable.

13. The assembly of claim 10, wherein the first gas meter body comprises a gas meter body of a first size, and wherein the second gas meter body comprises a gas meter body of a second size.

14. The assembly of claim 10, wherein the first gas meter body comprises a gas meter body of a first model line, and wherein the second gas meter body comprises a gas meter body of a second model line.

15. The assembly of claim 10, wherein the first sensor probe has a generally cylindrical outer surface extending between the first and second ends of the first sensor probe, and an outer diameter at the second end, the second sensor probe has an outer surface extending between the first and second ends of the second sensor probe, and an outer diameter at the second end that is greater than the outer diameter at the second end of the first sensor probe.

16. The assembly of claim 10, wherein the aperture of the second gas meter body has a diameter that is greater than a diameter of the aperture of the first gas meter body.

17. The assembly of claim 16, wherein the second sensor probe has an outer diameter at the first end of the second sensor probe that is greater than the outer diameter of the second sensor probe at the second end of the second sensor probe.

18. The assembly of claim 10, wherein the base coupling member comprises a female connector, and wherein the probe coupling members of the first and second sensor probes each comprise a male connector.

19. A rotary gas meter comprising a magnetic sensor assembly coupled thereto, the assembly comprising:
a counter module electronic volume corrector ("EVC");
a magnetic sensor probe operatively coupled to the counter module EVC and configured to be releasably secured within an aperture of a first gas meter body of the rotary gas meter,
the sensor probe having a first end, a second end, a generally cylindrical outer surface extending between the first and second ends, an outer diameter at the second end, and a longitudinal axis; and
an adapter sleeve,
the adapter sleeve having a first end, a second end, an outer surface extending between the first and second ends of the adapter sleeve, an outer diameter at the second end of the adapter sleeve, a longitudinal axis, and a sensor probe aperture extending from the first end of the adapter sleeve towards the second end of the adapter sleeve,
the sensor probe aperture being configured to receive the sensor probe within the adapter sleeve,
the adapter sleeve being configured to be releasably secured within an aperture of a second gas meter body of a second rotary gas meter, the aperture of the second gas meter body having a diameter that is greater than a diameter of the aperture of the first gas meter body of the rotary gas meter, wherein, in a first configuration, the counter module EVC may be coupled to the first gas meter body with the sensor probe positioned within the aperture of the first gas meter body for sensing rotation of a counter drive shaft of the first gas meter body, and wherein, in a second configuration uncoupled from the rotary gas meter and coupled to second rotary gas meter, the counter module EVC may be coupled to the second gas meter body with the sensor probe positioned within the adapter sleeve, and the adapter sleeve positioned within the aperture of the second gas meter body for sensing rotation of a counter drive shaft of the second gas meter body.

20. A rotary gas meter comprising a magnetic sensor assembly coupled thereto, the assembly comprising:
 a counter module EVC;
 a base coupling member operatively coupled to the counter module EVC;
 a first magnetic sensor probe configured to be releasably secured within an aperture of a first gas meter body of the rotary gas meter,
  the first sensor probe having a first end, a second end, and a probe coupling member extending from the first end of the first sensor probe, the probe coupling member of the first sensor probe being releasably engagable with the base coupling member; and
 a second magnetic sensor probe configured to be releasably secured within an aperture of a second gas meter body of a second rotary gas meter,
  the second sensor probe having a first end, a second end, and a probe coupling member extending from the first end of the second sensor probe, the probe coupling member of the second sensor probe being releasably engagable with the base coupling member;
 wherein, in a first configuration, the probe coupling member of the first sensor probe is engaged with the base coupling member to operatively couple the first sensor probe and the counter module EVC, and the counter module EVC may be coupled to the first gas meter body with the sensor probe positioned within the aperture of the first gas meter body for sensing rotation of a counter drive shaft of the first gas meter body, and
 wherein, in a second configuration uncoupled from the rotary gas meter and coupled to second rotary gas meter, the probe coupling member of the second sensor probe is engaged with the base coupling member to operatively couple the second sensor probe and the counter module EVC, and the counter module EVC may be coupled to the second gas meter body with the sensor probe positioned within the aperture of the second gas meter body for sensing rotation of a counter drive shaft of the second gas meter body.

* * * * *